United States Patent
Park et al.

(10) Patent No.: US 9,924,459 B2
(45) Date of Patent: Mar. 20, 2018

(54) METHOD AND APPARATUS FOR DETERMINING PACKET TRANSMISSION TIME USING POWER GAIN DUE TO PACKET TRANSMISSION DELAY

(71) Applicants: Samsung Electronics Co., Ltd., Suwon-si (KR); Seoul National University R&DB Foundation, Seoul (KR)

(72) Inventors: Daedong Park, Seoul (KR); Sungju Huh, Seoul (KR); Seongsoo Hong, Seoul (KR); Yong-Seok Park, Seoul (KR); Ok-Seon Lee, Suwon-si (KR); Young-Ki Hong, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 66 days.

(21) Appl. No.: 14/843,383

(22) Filed: Sep. 2, 2015

(65) Prior Publication Data

US 2016/0066268 A1 Mar. 3, 2016

(30) Foreign Application Priority Data

Sep. 2, 2014 (KR) .................. 10-2014-0116059

(51) Int. Cl.
| | | |
|---|---|---|
| *H04W 52/04* | (2009.01) | |
| *H04W 52/02* | (2009.01) | |
| *H04L 12/823* | (2013.01) | |
| *H04W 76/04* | (2009.01) | |
| *H04W 28/02* | (2009.01) | |
| *H04L 12/841* | (2013.01) | |

(52) U.S. Cl.
CPC ........ *H04W 52/0209* (2013.01); *H04L 47/28* (2013.01); *H04L 47/32* (2013.01); *H04W 28/0205* (2013.01); *H04W 76/046* (2013.01); *H04W 76/048* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 2003/0231058 | A1* | 12/2003 | Ezuka ................... | H03F 1/3294 330/149 |
| 2005/0254461 | A1* | 11/2005 | Shin ........................ | H04L 47/14 370/329 |
| 2008/0279138 | A1* | 11/2008 | Gonikberg ............ | H04W 8/005 370/328 |
| 2011/0044299 | A1* | 2/2011 | Spencer .............. | H04W 52/262 370/336 |

(Continued)

*Primary Examiner* — Brandon Renner
(74) *Attorney, Agent, or Firm* — McAndrews, Held & Malloy, Ltd.

(57) ABSTRACT

A method of determining a transmission time of a packet in a mobile device according to the present disclosure may include: if a request for the transmission of a present packet from at least one operated application is detected, identifying whether it is possible to delay a transmission time of the present packet; when it is possible to delay the transmission time of the present packet, calculating a power gain generated as the transmission time of the present packet is delayed; and determining whether the transmission time of the present packet will be delayed according to the calculated power gain.

18 Claims, 8 Drawing Sheets

(56) References Cited

U.S. PATENT DOCUMENTS

| | | | |
|---|---|---|---|
| 2011/0149773 A1* | 6/2011 | Lee | H03G 3/3078 |
| | | | 370/252 |
| 2012/0124196 A1 | 5/2012 | Brisebois et al. | |
| 2013/0094491 A1* | 4/2013 | Sun | H04W 52/383 |
| | | | 370/345 |
| 2015/0289248 A1* | 10/2015 | Wesemann | H04W 72/046 |
| | | | 455/452.1 |
| 2016/0212709 A1* | 7/2016 | Park | H04W 52/0251 |
| 2016/0309411 A1* | 10/2016 | Savolainen | H04W 52/0209 |
| 2016/0330010 A1* | 11/2016 | Qin | H04L 5/0058 |

* cited by examiner

METHOD AND APPARATUS FOR DETERMINING PACKET TRANSMISSION TIME USING POWER GAIN DUE TO PACKET TRANSMISSION DELAY

RELATED APPLICATION(S)

This application claims the priority under 35 U.S.C. § 119(a) to Korean Application Serial No. 10-2014-0116059, which was filed in the Korean Intellectual Property Office on Sep. 2, 2014, the entire content of which is hereby incorporated by reference.

BACKGROUND

The present disclosure relates to a method and an apparatus for predicting a power gain generated due to a packet transmission delay and determining a packet transmission time using the predicted power gain by a mobile device.

FIG. 1 is a view illustrating the state of a modem of a general mobile device. Here, for the convenience of description, an example in which the mobile device is a Long Term Evolution (LTE) device will be described. However, the embodiment of the present disclosure may be applied to communication devices, to which a delay time for the following state transition may be applied.

Referring to FIG. 1, in an idle situation in which packets are neither transmitted nor received, a modem of the mobile device stays in a Radio Resource Control (RRC)_IDLE state 100, in which a communication channel with a cellular network is released. Furthermore, in order to transmit and receive the packet, the state of the modem is transitioned 105 to an RRC_CONNECTED state 110 that has a communication channel with a cellular network. During the transition 105, a considerable power overhead is generated. In order to prevent this, the modem in the RRC_CONNECTED state 110 is delayed for a predetermined time period until the modem is transitioned 120 to the RRC_IDLE state 100 after the transmission/reception of the packet is completed. The predetermined time period is generally called a tail time. If packets are not successively transmitted or received within the tail time, a lot of power is wasted.

In order to prevent the waste, when a request for the transmission of a packet that may be transmission-delayed is generated, the mobile device delays the transmission of the packet and transmits the packet together with another packet generated after in order to use a technique for reducing the power that is consumed by the modem. However, when the packet transmission delay is used, power may be wasted due to the transmission delay of the corresponding packet.

SUMMARY

The present disclosure suggests a method and an apparatus for modeling a power gain $P_{gain}$ due to a packet transmission delay in consideration of a modem state of a mobile device, and determining a packet transmission time based on a predicted power gain.

In accordance with an aspect of the present disclosure, there is provided a method of determining a transmission time of a packet in a mobile device, the method including: if a request for the transmission of a present packet from at least one operated application is detected, identifying whether it is possible to delay a transmission time of the present packet; when it is possible to delay the transmission time of the present packet, calculating a power gain generated as the transmission time of the present packet is delayed; and determining whether the transmission time of the present packet will be delayed according to the calculated power gain.

In accordance with another aspect of the present disclosure, there is provided an apparatus for determining a transmission time of a packet, the apparatus including: a controller that, if a request for transmission of a present packet from at least one application through a transceiver is detected, identify whether it is possible to delay the transmission time of the present packet; and a determination unit that, when it is possible to delay a transmission time of the present packet according to an instruction of the controller, calculates a power gain generated as the transmission time of the present packet is delayed and determining whether the transmission time of the present packet will be delayed according to the calculated power gain.

According to the embodiment of the present disclosure, a mobile device predicts a power gain due to a packet transmission delay based on the state of a modem and a networking pattern of an application, and performs a packet transmission delay only when it is predicted that a power gain is generated due to the packet transmission delay, thereby reducing power consumption in a modem of the mobile device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
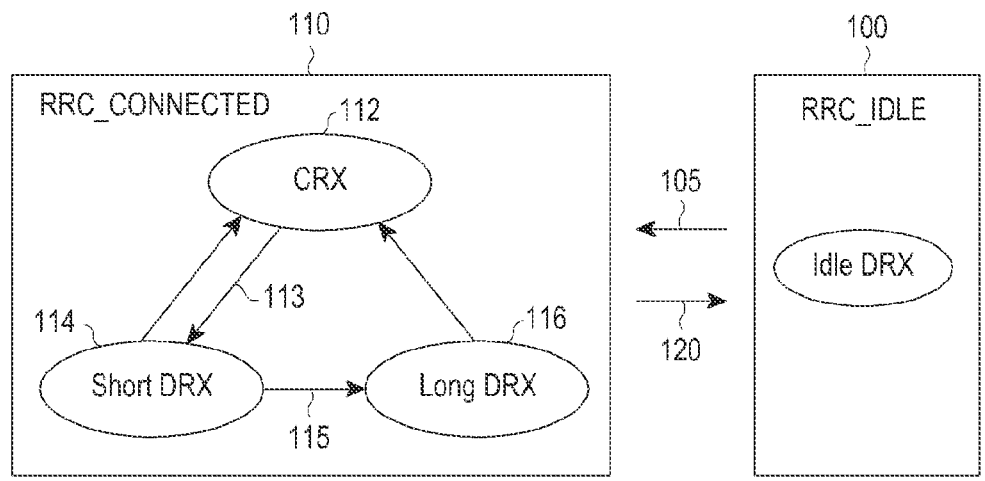
FIG. 1 is a view illustrating a state of a modem of a general mobile device.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms which will be described below are terms defined in consideration of the functions in the present disclosure, and may be different according to users, intentions of the users, or customs.

An RRC_CONNECTED state of a modem in a general mobile device may be classified, in detail, into three substates as illustrated in FIG. 1. Referring to FIG. 1, the RRC_CONNECTED state 110 includes a Continuous Reception (CRX) sub-state 112 that substantially performs the transmission and reception of packets, a short Discontinuous Reception (DRX) sub-state 114 that performs discontinuous reception of packets at a predetermined period, and a long DRX sub-state 116 that performs the discontinuous reception of packets at a period longer than that of the short DRX 114 state.

Figure 2:
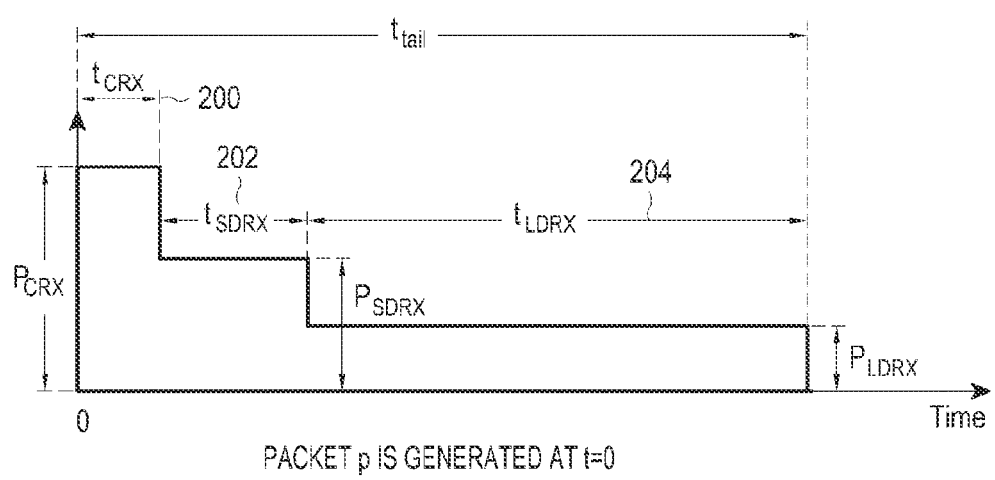
FIG. 2 is an exemplary graph illustrating power consumption in a model of a general mobile device.

FIG. 2 is an exemplary graph illustrating power consumption in a model of a general mobile device. For convenience of description, FIG. 2 will be described with reference to a state of the modem of FIG. 1.

Referring to FIG. 2, assume that transmission and reception of a packet p is generated in a time point of 't=0' in a modem of a mobile device in the RRC_CONNECTED state 110. In this case, if a packet, which will be transmitted and received, is not generated for a predetermined amount of time $t_{CRX}$ 200, the CRX sub-state 112 is transited to the short DRX sub-state 114 in step 113. A $t_{CRX}$ is generally defined as a time period for which a packet stays in a CRX state (e.g., the CRX sub-state 112) when a corresponding modem is in an idle state. Thereafter, if a packet, which will be transmitted and received by the modem corresponding to the short DRX sub-state 114, is not generated for a predetermined amount of time $t_{SDRX}$ 202, the short DRX sub-state 114 is transitioned to the Long DRX sub-state 116 in step 115 again. A $t_{SDRX}$ is generally defined as a time period in which the modem in an idle state stays in a short DRX state (e.g., the short DRX sub-state 114). Finally, if a packet that will be transmitted and received is not generated by the modem in the Long DRX sub-state 116 for a predetermined amount of time $t_{LDRX}$ 204, the state of the modem is transitioned to the RRC_IDLE state 100 for minimizing power consumption in step 120. A $t_{LDRX}$ is generally defined as a time period in which a packet stays in a long DRX state when a modem is in an idle state.

As a result, a tail time as described above is consumed while the modem in the RRC_CONNECTED state 110 is transitioned to the RRC_IDLE 110 state. The tail time, known as $t_{tail}$, is a total sum of the transition times of the above-described states, and is calculated in Equation 1.

$$t_{tail} = t_{CRX} + t_{SDRX} + t_{LDRX} \qquad \text{<Equation 1>}$$

As illustrated in FIG. 2, corresponding powers are consumed for the sub-states while the modem is transitioned from the RRC_CONNECTED state 110 to the RRC_IDLE state 100. It is set such that a power $P_{CRX}$ consumed in the modem in the CRX section is higher than a power $P_{SDRX}$ consumed in the short DRX section, and a power $P_{LDRX}$ consumed in the long DRX section is lower than the $P_{SDRX}$. Accordingly, a packet transmission delay method for preventing power generated at a tail time at which the modem is transitioned from the RRC_CONNECTED 110 state to the RRC_IDLE 100 state is introduced.

Figure 3A:
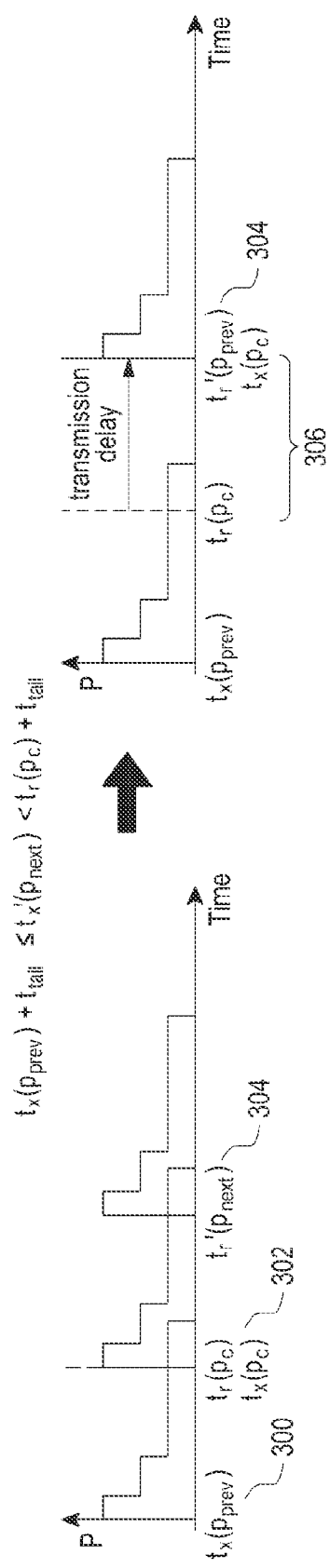
FIG. 3A is a view illustrating an example of a general packet transmission delay.

FIG. 3A is a view illustrating an example of a general packet transmission delay.

Referring to FIG. 3A, a case in which a period at which a packet requested to be transmitted by a modem is constant. In this example, a previous packet $p_{prev}$ is generated at a time 300 of $t_x=0$, a current packet $p_c$ is generated at a time $t_r$ 302 before the tail time of $p_{prev}$ ends, and a next packet $p_{next}$ is generated at a time $t_r'$ 304 before the tail time of the $p_c$ ends. In this case, assume that the generation time of the corresponding packet has the same interval from the generation time of a previous packet.

Furthermore, $p_c$ may be a packet that is transmission-delayed. The powers at time 300 (t=0), time $t_r$ 302, and time $t_r'$ 304 represent power consumptions during the tail time generated after the transmission of the corresponding packet. In this case, the power generated due to the tail time of the $p_c$ at a time section 306 corresponding to time $t_r$ 302 and time $t_r'$ 304 is reduced by transmitting the $p_c$ and the $p_{next}$ together at time $t_r'$ 304 after transmission-delaying the $p_c$ to time $t_r'$ 304 corresponding to the transmission time of the next packet $p_{next}$ by the modem.

Figure 3B:
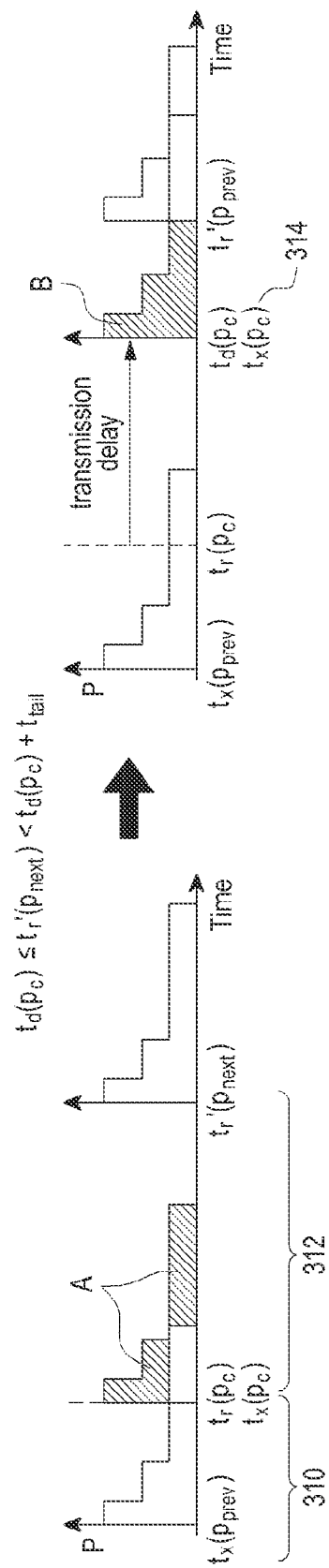
FIG. 3B is a view illustrating another example of a general packet transmission delay.

FIG. 3B is a view illustrating another example of a general packet transmission delay.

Referring to FIG. 3B, a case in which a period at which a packet requested to be transmitted by the modem is not constant. As a detailed example, a previous packet $p_{prev}$ is generated at a time of $t_x=0$, a current packet $p_c$ is generated at a time $t_r$ before the tail time of $p_{prev}$ ends, and the next packet $p_{next}$ is generated at a time $t_r'$ 304 a predetermined time period after the tail time of $p_c$ ends. That is, the lengths of a time section 310 from a generation time of $p_{prev}$ to a time when the $p_c$ is generated and a time section 312 from a generation time of the $p_c$ and a generation time of the $p_{next}$ are different. That is, in the corresponding application, the generation time of a packet is so irregular that it is difficult to predict an accurate transmission generation time. In this case, the modem wrongly predicts the $t_r'$ corresponding to a generation time of the $p_{next}$ or reaches a maximum delay limit of the $p_c$ to transmit the $p_c$ at time $t_d$ 314 located before the time $t_r'$ after transmission-delaying the $p_c$. Then, as the transmission is delayed from an existing transmission time of the $p_c$ but the transmission-delayed time $t_d$ 314 does not coincide with a generation time of the $p_{next}$, power consumption is generated due to the tail time for the $p_c$ in a time section from time $t_d$ 314 to time $t_r'$. In this case, when a power corresponding to the difference between the total power before the transmission is delayed and the total power after the transmission is delayed, which is a hatched segment A, and the power corresponding to the difference between the total power after the transmission is delayed and the total power before the transmission is delayed, which is a hatched segment B, are compared, a situation may occur in which the hatched B is larger. Accordingly, the power consumption may increase through the transmission delay.

Figure 3C:
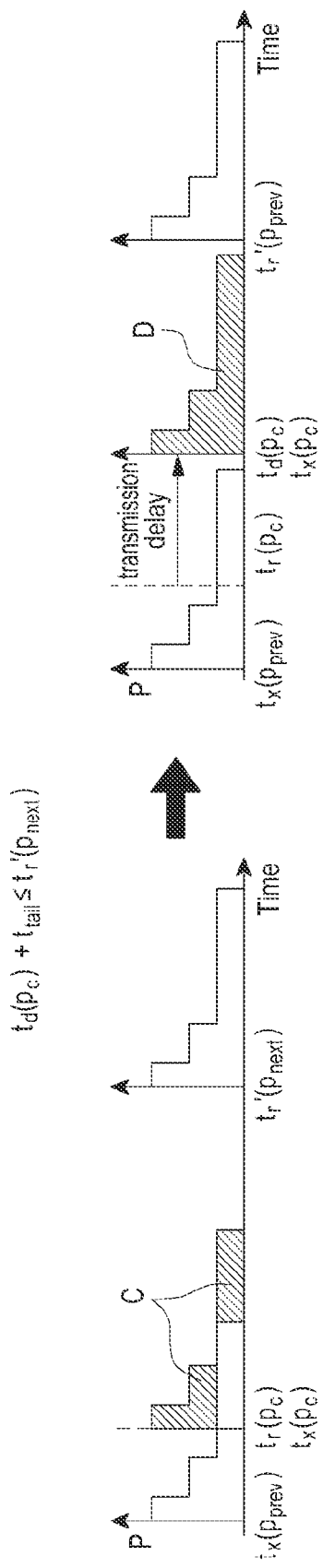
FIG. 3C is a view illustrating another example of a general packet transmission delay.

FIG. 3C is a view illustrating another example of a general packet transmission delay.

Referring to FIG. 3C, another example in which a period at which a packet requested to be transmitted by the modem is not constant, as is illustrated in FIG. 3B. In this case, because it is difficult to precisely predict time $t_r'$ that corresponds to the generation time of the $p_{next}$, $p_c$ may be transmitted after being transmission-delayed to time $t_d$ located before time $t_r'$. Then, as a transmission is delayed from an existing transmission time of the $p_c$ but the transmission-delayed time $t_d$ does not coincide with the generation time of the $p_{next}$, power consumption is generated due to the tail time for the $p_c$ in a time section from time $t_d$ 314 to time $t_r'$. In this case, when power corresponding to the difference between the total power before the transmission is delayed and the total power after the transmission is delayed, which is a hatched segment C, and a power corresponding to the difference between the total power after the transmission is delayed and the total power before the transmission is delayed, to which a hatched segment D are compared, a situation may occur in which the hatched segment D is larger. Accordingly, it can be seen that power consumption increases through a transmission delay.

Accordingly, hereinafter, in the embodiment of the present disclosure, if a packet that is requested to be transmitted by the modem of the mobile device is generated, a power gain model that may be generated when a transmission delay is applied to the generated packet is modeled. Transmission times of the corresponding packets are scheduled by reflecting the modeled result. In detail, only when the modeled power gain is a positive number, a transmission delay is applied to the corresponding packet. When the modeled power gain is 0 or less, the packet is transmitted at an existing transmission time without applying a transmission delay to the corresponding packet.

In detail, the embodiment of the present disclosure largely includes three parts. First, the current state and the following state change of the modem of the mobile device are predicted. Second, a power gain that may be generated when a packet transmission delay is applied is calculated using the predicted result. Finally, a transmission time of the corresponding packet is scheduled according to the result value of the calculated power gain.

Predict the Current State and the Following State Change of the Modem

Hereinafter, in the embodiment of the present disclosure, in order to predict the current state of the modem of the mobile device, a transmission/reception time of the packet that has been transmitted and received most recently by the modem may be used. That is, the modem, according to the embodiment of the present disclosure, drives a state change timer that has a delay time for state transition from a transmission/reception time of the packet that was transmitted and received most finally to sub-states of the above-described RRC_CONNECTED, that is, a driving time corresponding to $t_{CRX}$, $t_{SDRX}$, and $t_{LDRX}$. Further, the current state may be determined by checking whether a driving time of the corresponding state change timer elapses from the transmission/reception time of the packet that was transmitted and received most recently or a time corresponding to the current state of the corresponding modem. When the corresponding modem provides an interface that informs the RRC state according to another embodiment of the present disclosure, the current state of the modem may be acquired using the interface.

The following state change of the modem may be predicted using networking patterns for the applications currently operated in the modem. That is, a networking pattern of the corresponding application is detected by learning the applications for a predetermined time period, and the next transmission time is predicted using the detection result. For example, assume that Application A transmits and receives packets to and from a server at a time interval of 30 seconds for a predetermined time period. Then, if it is assumed that packets are exchanged with the server before 10 seconds while the current application A is operated, and the modem may predict that the next packet will be transmitted and received after 20 seconds.

Calculate a Power Gain $P_{gain}$ Generated when a Packet Transmission Delay is Applied A power gain $P_{gain}$ when a transmission delay is applied to a corresponding packet based on a predicted result according to the embodiment of the present disclosure may be defined as in Equation 2.

$P_{gain}$=(Power consumption when a transmission delay is not applied to the corresponding packet)−(power consumption when a transmission delay is applied to the packet)   <Equation 2>

The modem, according to the embodiment of the present disclosure, calculates $P_{gain}$ according to a total of nine embodiments based on a result obtained by predicting the current state and the following state at the transmission request time of the corresponding packet. First, the current state of the modem is classified into an RRC_CONNECTED state and an RRC_IDLE state.

Figure 4A:
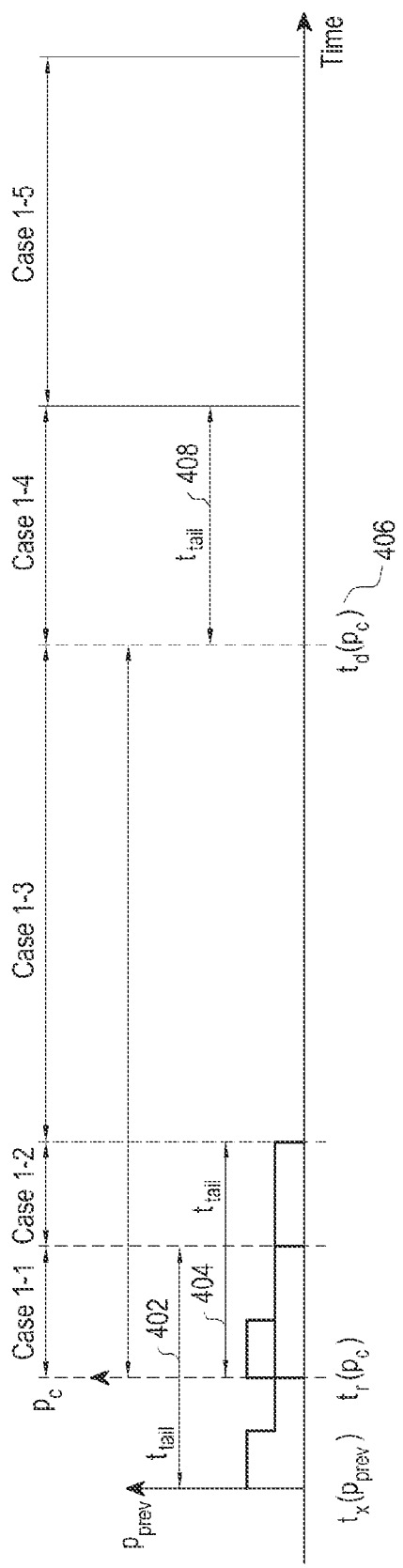
FIG. 4A is a view illustrating an example of calculating a power gain generated when a model in an RRC-CONNECTED state undergoes a packet transmission delay according to an embodiment of the present disclosure.

FIG. 4A is a view illustrating an example of calculating a power gain generated when a model in an RRC-CONNECTED state (e.g., the RRC-CONNECTED state 110 of FIG. 1) undergoes a packet transmission delay according to an embodiment of the present disclosure.

Referring to FIG. 4A, a power gain generated when a packet transmission delay of a modem is generated may be classified into five cases and then calculated.

Case 1-1 is a case $(t_r(p_c) < t_r'(p_{next}) < t_x(p_{prev}) + t_{tail})$ in which the transmission request time $t_r'$ of the next packet pnext is generated in a time section from a transmission request time $t_r$ 400 of the current packet $p_c$ and a transmission time $t_x$ of the previous packet $p_{prev}$ to t tail time $t_{tail}$ 402. In this case, if a power gain according to Equation 2 is calculated, $P_{gain}$ is a ways greater than 0 and thus a packet transmission delay may be applied.

Case 1-2 is a case $(t_x(p_{prev}) + t_{tail} < t_r'(p_{next}) < t_r(p_c) + t_{tail})$ in which a transmission request time $t_r'$ of the next packet $p_{next}$ is generated in a time section from a time when the previous packet $p_{prev}$ ends to a time when the $t_{tail}$ 404 of the current packet $p_c$ ends. In this case, the $P_{gain}$ according to Equation 2 is calculated as in Equation 3.

$$P_{gain} = \int_0^{t_{tail}} P_{tail}(t)dt - \left( \int_{t_r(p_c)-t_x(p_{prev})}^{t_{tail}} P_{tail}(t)dt + \int_{t_r'(p_{next})-t_r(p_c)}^{t_{tail}} P_{tail}(t)dt \right) - P_{PM}$$

$$= \int_0^{t_r(p_c)-t_x(p_{prev})} P_{tail}(t)dt + \int_0^{t_r'(p_{next})-t_r(p_c)} P_{tail}(t)dt - \int_0^{t_{tail}} P_{tail}(t)dt - P_{PM}$$

<Equation 3>

Here, $P_{PM}$ represents power generated when the modem is transited from the RRC_CONNECTED to the RRC_IDLE.

Case 1-3 is a case $(t_r(p_c) + t_{tail} \le t_r'(p_{next}) < t_d(p_c))$ in which the transmission request time $t_r'$ of the next packet $p_{next}$ is generated in a time section from a time when the $t_{tail}$ 404 of the current packet $p_c$ ends to a maximum delay allowable time $t_d$ 406 when a packet transmission delay may be applied to the current packet $p_c$. In this case, the $P_{gain}$ according to Equation 2 is calculated as in Equation 4.

$\int_0^{t_{tail}} P_{tail}(t)dt - \int_{t_r(p_c)-t_x(p_{prev})}^{t_{tail}} P_{tail}(t)dt$   <Equation 4>

Because the $P_{gain}$ of Case 1-3 calculated in this way always has a value of 0 or more, a packet transmission delay may be applied.

Case 1-4 is a case $(t_d(p_c) \le t_r'(p_{next}) < t_d(p_c)+t_{tail})$ in which a transmission request time $t_r'$ of the next packet $p_{next}$ is generated in a time section from the maximum delay allowable time $t_d$ 406 to the $t_{tail}$ 408 of the transmission-delayed $p_c$. In this case, the $P_{gain}$ according to Equation 2 is calculated as in Equation 5.

$$\int_{t_r'(p_{next})-t_d(p_c)}^{tail} P_{tail}(t)dt - \int_{t_r(p_c)-t_s(p_{prev})}^{tail} P_{tail}(t)dt \qquad <\text{Equation 5}>$$

Case 1-5 is a case $(t_r'(p_{next}) \ge t_d(p_c)+t_{tail})$ in which the transmission request time $t_r'$ of the next packet $p_{next}$ is generated after a time section corresponding to the $t_{tail}$ 408 of the transmission-delayed $p_c$. In this case, the $P_{gain}$ according to Equation 2 is calculated as in Equation 6.

$$-[\int_{t_r(p_c)-t_s(p_{prev})}^{tail} P_{tail}(t)dt + P_{PM}] \qquad <\text{Equation 6}>$$

As described above, the $P_{gain}$ calculated for Case 1-5 always has a value of 0 or less. Accordingly, because power is rather wasted when a packet transmission delay is applied in the situation of Case 1-5, a packet transmission delay is not applied in the embodiment of the present disclosure.

Figure 4B:
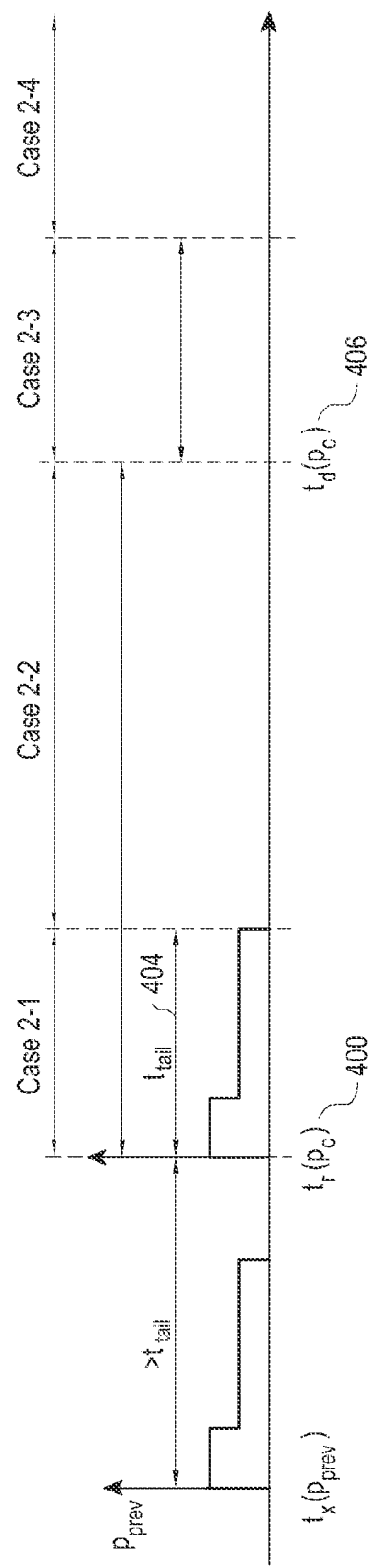
FIG. 4B is a view illustrating an example of calculating a power gain generated when a modem in an RRC_IDLE state undergoes a packet transmission delay according to an embodiment of the present disclosure.

FIG. 4B is a view illustrating an example of calculating a power gain generated when a modem in an RRC_IDLE state undergoes a packet transmission delay according to an embodiment of the present disclosure.

Referring to FIG. 4B, a power gain generated when the transmission of a packet by a modem is delayed may be classified into four cases and calculated.

Case 2-1 is a case $(t_r(p_c) < t_r'(p_{next}) < t_r(p_c)+t_{tail})$ in which the transmission request time $t_r'$ of the next packet $p_{next}$ is generated in a time section from a transmission request time $t_r$ 400 of the current packet $p_c$ to a time when the $t_{tail}$ 404 of the pc ends, and the $P_{gain}$ according to Equation 2 is calculated as in Equation 7. In this case, the calculated $P_{gain}$ always has a value of 0 or more.

$$\int_0^{t_r'(p_{next})-t_r(p_c)} P_{tail}(t)dt \qquad <\text{Equation 7}>$$

Case 2-2 is a case $(t_r(p_c)+t_{tail} \le t_r'(p_{next}) < t_d(p_c))$ in which the transmission request time $t_r'$ of the next packet $p_{next}$ is generated in a time section from a time when the $t_{tail}$ 404 of the current packet pc ends to a maximum delay allowable time $t_d$ 406 when a packet transmission delay may be applied to the current packet $p_c$, and the $P_{gain}$ according to Equation 2 is calculated as in Equation 8. In this case, the calculated $P_{gain}$ always has a value of 0 or more.

$$P_{SDRX} \cdot t_{SDRX} + P_{LDRX} \cdot t_{LDRX} + P_{PM} \qquad <\text{Equation 8}>$$

Case 2-3 is a case $(t_d(p_c) \le t_r'(p_{next}) < t_d(p_c)+t_{tail})$ in which the transmission request time $t_r'$ of the next packet $p_{next}$ is generated in a time section from a maximum delay allowable time when a packet transmission delay may be applied to the current packet $p_c$ to a time when the $t_{tail}$ of the transmission-delayed $p_c$ ends, and the $P_{gain}$ according to Equation 2 is calculated as in Equation 9. In this case, the calculated $P_{gain}$ always has a value of 0 or more.

$$\int_{t_r'(p_{next})-t_d(p_c)}^{tail} P_{tail}(t)dt + P_{PM} \qquad <\text{Equation 9}>$$

Finally, Case 2-4 is a case $(t_r'(p_{next}) \ge t_d(p_c)+t_{tail})$ in which the transmission request time $t_r'$ of the next packet $p_{next}$ is generated in a time section after at a time when the $t_{tail}$ of the $p_c$ that was transmission-delayed by a maximum delay allowable time $t_d$ 406 ends, and the $P_{gain}$ according to Equation 2 is calculated as 0.

As a result, because all the value of $P_{gain}$ are a positive number larger than 0 in the other cases of the four embodiments of FIG. 4B than 2-4 case, a transmission delay may be applied to the corresponding packet. Furthermore, in Case 2-4, because a value of $P_{gain}$ is 0, a transmission delay is not applied.

As described above, when the power gain calculated according to Equation 2 is 0 or less ($P_{gain} \le 0$), the modem according to the embodiment of the present disclosure schedules such that the corresponding packet is transmitted at an existing transmission time without applying a transmission delay to the transmission-requested packet.

Packet Scheduling Technique

The modem according to the embodiment of the present disclosure identifies whether a transmission delay may be applied to a transmission-requested packet. In detail, it is identified whether the application that delivered a request for the transmission of a packet uses a user-interactive device, for example, a touch screen, a speaker, or a microphone. If the application uses a user-interactive device, the corresponding packet may be determined to be a packet of which transmission cannot be delayed. For example, a sound source providing application that is being reproduced in a web browser that occupies the screen of a smartphone or the background may be included. If the application does not use a user-interactive device, the corresponding packet may be determined as a packet of which transmission delay may be applied.

In the identification result, when the packet cannot be transmission-delayed, the modem, according to the embodiment of the present disclosure, schedules such that the packet is transmitted at a transmission request time of the corresponding packet without delaying the transmission of the packet.

Further, in the identification result, if the transmission-request packet is a packet that may be transmission-delayed, $P_{gain}$ due to a delay of transmission of the packet is calculated. Furthermore, only when the calculated $P_{gain}$ value is 0 or more, transmission of the packet is delayed.

Furthermore, according to the embodiment of the present disclosure, when it is determined that a transmission delay is applied to the corresponding packet, it is identified whether there are present packets to which a transmission delay is already applied. If the transmission-delayed packets are present, packets present when the current packet is transmission-delayed are transmitted together.

Figure 5:
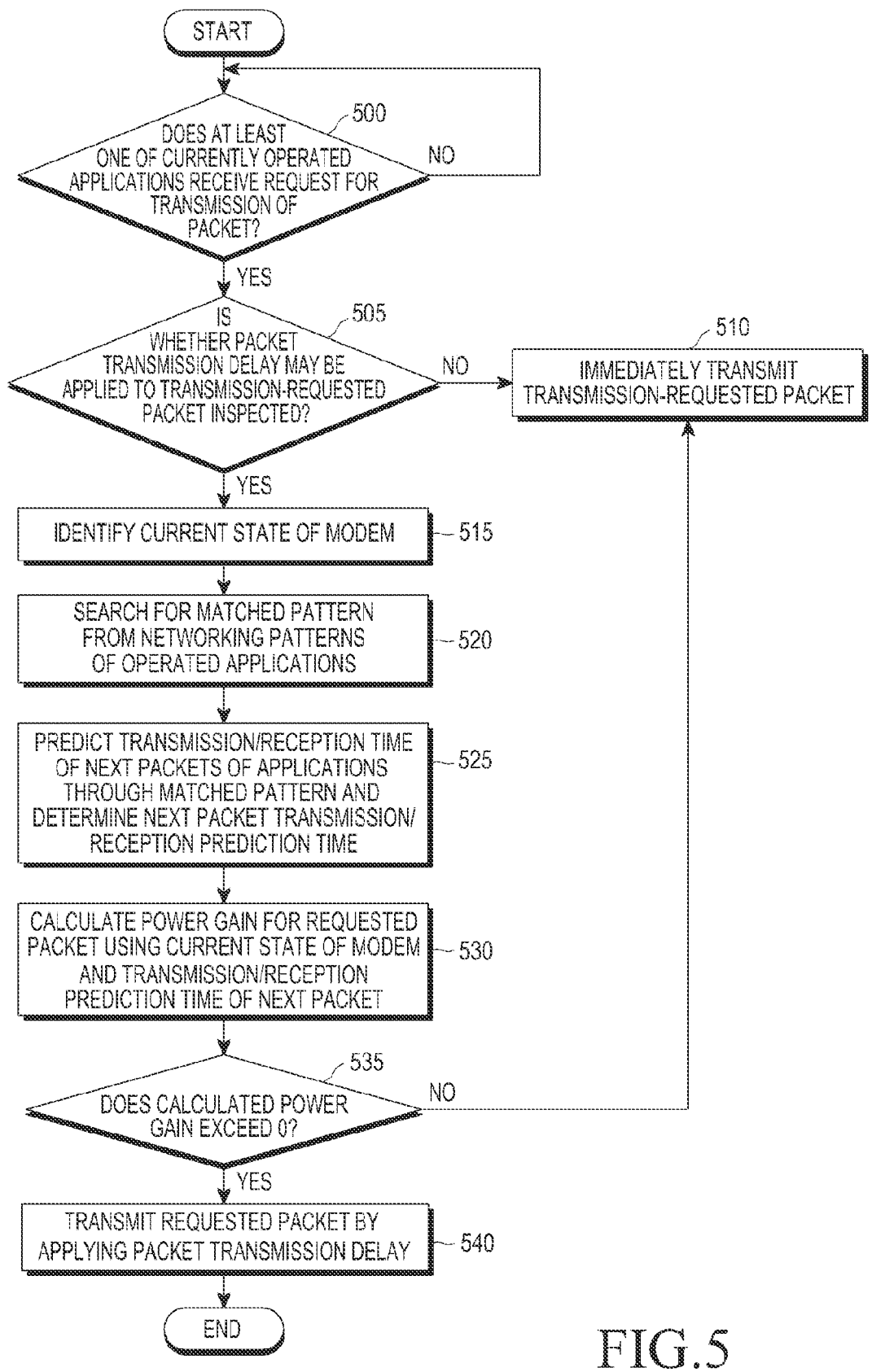
FIG. 5 is an example of a flowchart of an overall operation of calculating a power gain when the transmission of a packet is delayed and of scheduling a transmission time of the packet based on the calculated power gain.

FIG. 5 is an example of a flowchart of an overall operation of calculating a power gain when the transmission of a packet is delayed and scheduling a transmission time of the packet based on the calculated power gain.

Referring to FIG. 5, in step 500, the modem of the mobile device monitors the currently operated applications and identifies whether a request for the transmission of a packet from at least one application is received. In the identification result, if a transmission request is not received, the monitoring operation is performed until a request for transmission of a packet is received.

In the identification result, when a request for transmission of a packet is received, in step 505, the modem inspects whether the transmission-requested packet may be transmission-delayed.

In the inspection result, when the transmission-requested packet cannot be transmission-delayed, the modem identifies whether the packets to which a transmission delay is already applied are present. If the transmission-delayed packets are present, the transmission-requested packets are transmitted together with the present packets.

In the inspection result, when the requested packet is a packet to which a transmission delay may be applied, in step 515, the modem identifies the current state to calculate a power gain when the requested packet is transmission-delayed. In step 520, the modem searches for matched patterns of the networking patterns of operated applications in the system to predict the following state change. In step 525, the modem predicts a transmission/reception time for the next packets of the applications through the matched pattern, and determines the closest time as the next packet transmission/reception predicting time. The embodiments of determining the next packet transmission/reception predicting time may be described as the cases of FIGS. 4A and 4B.

In step 530, the modem calculates a power gain due to a transmission delay of the requested packet using the identified current state of the modem and the determined next packet transmission/reception predicting time. The embodiments of calculating the power gain may be described as the cases of FIGS. 4A and 4B. In step 535, the modem identifies whether the calculated power gain exceeds 0. In the identification result, if the calculated power gain is a value of 0 or less, the process proceeds to step 510 to immediately transmit the requested packet without applying a transmission delay. Even in this case, if packets to which an existing transmission delay is applied are present, the packets are immediately transmitted together with the requested packet.

In the identification result, if the calculated power gain is a positive number of 0 or more, in step 540, the modem applies a transmission delay of the requested packet based on the determined next packet transmission/reception time, and sets a timer for the requested packet to a maximum delay allowable time. If a driving time of the timer set for the requested packet expires, the requested packet is transmitted together with the packets to which the exiting packet transmission delay is applied.

Figure 6:
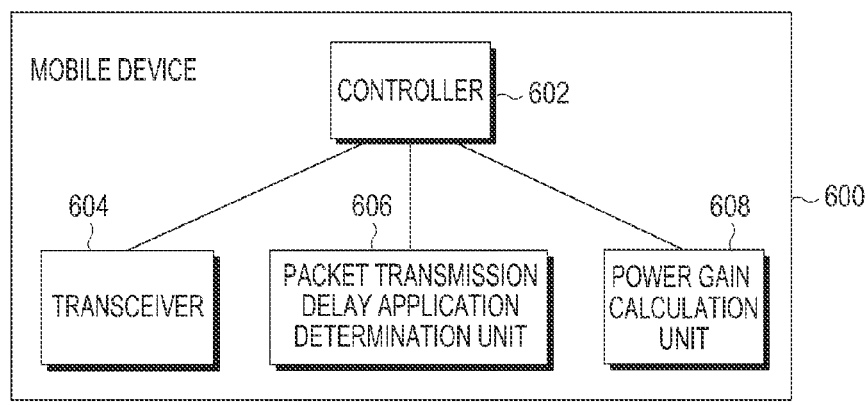
FIG. 6 is an example of a configuration of a mobile device according to an embodiment of the present disclosure.

FIG. 6 is an example of a mobile device according to the embodiment of the present disclosure.

Referring to FIG. 6, a mobile device 600 includes, for example, a controller 602, a transceiver 604, a packet transmission delay application determination unit 606, and a power gain calculation unit 608. The configuration of the mobile device is an example, and sub-units may be integrated into one unit or may be classified according to an intention of the business or the embodiment.

The controller 602 monitors applications that are currently driven by the mobile device. If an application that requests transmission of a packet through the transceiver 604, the controller 602 controls the packet transmission delay application determination unit 606 such that it is determined whether a delay of transmission of the packet may be applied. The packet transmission delay application determination unit 606 is operated in accordance with step 505 that has been described above. When the packet may be transmission-delayed, the controller 602 controls such that the power gain calculation unit 608 calculates a power gain that may be generated when the transmission of the packet is delayed. The calculation operation corresponds to steps 525 to 530 of FIG. 5. Then, the controller 602 determines whether the calculated power gain is a positive number, and controls the transceiver 604 such that a transmission delay is applied to the packet using the predicted next packet transmission/reception time. If the power gain is 0 or less, the transceiver 604 is controlled to immediately transmit the packet.

Figure 7:
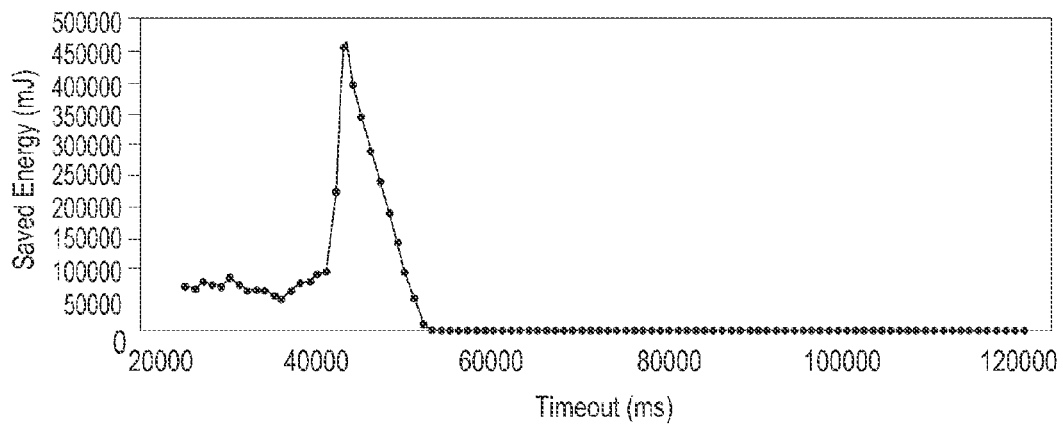
FIG. 7 is a graph obtained by comparing power gains of a general packet transmission delay and a packet transmission delay according to the embodiment of the present disclosure.

FIG. 7 is a graph obtained by comparing power gains of a general packet transmission delay and a packet transmission delay according to the embodiment of the present disclosure.

Referring to FIG. 7, it is assumed that a total of seven applications are used in the mobile device. In Foreground, LiveScore applications for performing broadcasting of sports letters in real time are being executed, and the applications renew data at an interval of 60 seconds. In the background, applications of BBC News, Facebook, ESPN, Bloomberg, Naver Line, and a weather forecasting office are performed. The applications were executed for 200 minutes, and total power consumption was measured by Monsoon Power Monitor.

As a result, the total power consumption of the smartphone was 9,020 J for 200 minutes, and FIG. 7 that represents power reduction according to a maximum delay allowable time of the packets that may be delayed illustrates that 457 J (5.1%) may be reduced when the maximum delay allowable time is 43 seconds.

In the embodiment of the present disclosure, a power gain that may be acquired when a transmission delay is generated is calculated, and a transmission delay is applied to the corresponding packet only when the calculated power gain is a positive number. Accordingly, power damage may be prevented as a transmission delay is applied.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

What is claimed is:

1. A method of determining a transmission time of a packet in a mobile device, the method comprising:
   detecting a transmission request of the packet from at least one operated application;
   obtaining a first power consumption amount of the packet transmitted at the first transmission time, and a second power consumption amount of the packet transmitted at the second transmission time;
   determining a power gain by comparing the first power consumption amount with the second power consumption amount; and
   transmitting the packet at the second transmission time delayed from the first transmission time in response to the comparing result that first power consumption amount is greater than the second power consumption amount.

2. The method of claim 1, wherein the second transmission time is:
   a next transmission time of the packet, and
   wherein the next transmission time is determined based on a predetermined pattern corresponding to the at least one operated application.

3. The method of claim 1, further comprising:
   determining whether packets of which transmission times are delayed are present; and
   if the packets of which transmission times are delayed are present, transmitting the packet together with the packets.

4. The method of claim 1, further comprising:
   if a transmission request time of a next packet is generated in a time interval from a transmission request time of the packet and a transmission time of a previous packet to a predetermined time, transmitting the packet at a second transmission time.

5. The method of claim 1, further comprising:
   if a transmission request time of a next packet is generated in a time interval from a time when a predetermined time of the packet ends to a maximum delay allowable time when it is possible to delay the transmission time of the packet, transmitting the packet at a second transmission time.

6. The method of claim 1, wherein if the comparing result is that the first power consumption amount is less than the second power consumption amount, transmitting the packet at the first transmission time.

7. The method of claim 1, further comprising:
if the comparing result is that the first power consumption amount is less than the second power consumption amount, determining whether packets of which transmission times are delayed are present; and
if the packets of which transmission times are delayed are present, transmitting the packet together with the packets.

8. The method of claim 1, wherein
when the at least one operated application does not currently use a user-interactive device, determining that it is able to delay the transmission time of the packet.

9. The method of claim 8, wherein the user-interactive device comprises at least one of a touch screen, a speaker, and a microphone.

10. An apparatus for determining a transmission time of a packet, the apparatus comprising:
a transceiver configured to transmit a packet according to an instruction of a controller; and
the controller configured to detect a transmission request of the packet from at least one application through a transceiver, obtain a first power consumption amount of the packet transmitted at the first transmission time, and a second power consumption amount of the packet transmitted at the second transmission time, determine a power gain by comparing the first power consumption amount with the second power consumption amount, and control the transceiver to transmit the packet at the second transmission time delayed from the first transmission time in response to the comparing result that first power consumption amount is greater than the second power consumption amount.

11. The apparatus of claim 10, wherein the second transmission time is a next transmission time of the packet, and wherein the next transmission time is determined based on a predetermined pattern corresponding to the at least one operated application.

12. The apparatus of claim 10, wherein the controller is configured to determine whether packets of which transmission times are delayed are present, and if the packets of which transmission times are delayed are present, control the transceiver to transmit the packet together with the packets.

13. The apparatus of claim 10, wherein if transmission request time of a next packet is generated in a time interval from a transmission request time of the packet and a transmission time of a previous packet to a predetermined time, the controller is configured to control the transceiver to transmit the packet at a second transmission time.

14. The apparatus of claim 10, wherein if transmission request time of a next packet is generated in a time interval from a time when a predetermined time of the packet ends to a maximum delay allowable time when it is able to delay the transmission time of the packet, the controller is configured to control the transceiver to transmit the packet at a second transmission time.

15. The apparatus of claim 10, wherein if the comparing result is that the first power consumption amount is less than the second power consumption amount, the controller is configured to control the transceiver to transmit the packet at the first transmission time.

16. The apparatus of claim 10, wherein if the comparing result is that the first power consumption amount is less than the second power consumption amount, the controller is configured to determine whether packets of which transmission times are delayed are present, if the packets of which transmission times are delayed are present, control the transceiver to transmit the packet together with the packets.

17. The apparatus of claim 10, wherein when the at least one operated application does not currently use a user-interactive device, the controller determines that it is able to delay the transmission time of the packet.

18. The apparatus of claim 17, wherein the user-interactive device comprises at least one of a touch screen, a speaker, and a microphone.

* * * * *